US012789081B2

(12) United States Patent
Li

(10) Patent No.: US 12,789,081 B2
(45) **Date of Patent: *Nov. 10, 2026**

(54) COMPUTER SYSTEM AND PERIPHERAL INPUT DEVICE FOR CHANGING MOVEMENT SIGNAL

(71) Applicant: PixArt Imaging Inc., Hsin-Chu County (TW)

(72) Inventor: Jr-Yi Li, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 242 days.

This patent is subject to a terminal disclaimer.

(21) Appl. No.: 18/792,967

(22) Filed: Aug. 2, 2024

(65) Prior Publication Data

US 2024/0390781 A1 Nov. 28, 2024

Related U.S. Application Data

(63) Continuation of application No. 18/368,580, filed on Sep. 15, 2023, now Pat. No. 12,083,416, which is a continuation of application No. 17/536,900, filed on Nov. 29, 2021, now Pat. No. 11,806,610.

(51) Int. Cl.

| | |
|---|---|
| ***A63F 13/22*** | (2014.01) |
| ***A63F 13/23*** | (2014.01) |
| ***A63F 13/533*** | (2014.01) |
| *G06F 3/0354* | (2013.01) |
| *G06F 3/038* | (2013.01) |

(52) U.S. Cl.

CPC .............. *A63F 13/22* (2014.09); *A63F 13/23* (2014.09); *A63F 13/533* (2014.09); *A63F 2300/1018* (2013.01); *A63F 2300/1025* (2013.01); *A63F 2300/308* (2013.01); *G06F 3/03543* (2013.01); *G06F 3/038* (2013.01)

(58) Field of Classification Search

None

See application file for complete search history.

(56) References Cited

U.S. PATENT DOCUMENTS

| | | | | |
|---|---|---|---|---|
| 11,442,557 | B2 * | 9/2022 | Wolff-Petersen | G06F 3/0482 |
| 11,458,388 | B1 * | 10/2022 | Kestell | A63F 13/42 |
| 2010/0100359 | A1 * | 4/2010 | Podoloff | G06F 3/038 702/191 |
| 2011/0086706 | A1 * | 4/2011 | Zalewski | G06F 3/017 463/36 |
| 2015/0298001 | A1 * | 10/2015 | Soelberg | A63F 13/42 463/37 |
| 2017/0282063 | A1 * | 10/2017 | Krishnamurthy | A63F 13/69 |

(Continued)

FOREIGN PATENT DOCUMENTS

| | | |
|---|---|---|
| CN | 1975698 A | 6/2007 |
| CN | 101510126 A | 8/2009 |

*Primary Examiner* — Jay Trent Liddle

(74) *Attorney, Agent, or Firm* — WPAT, PC

(57) ABSTRACT

There is provided a computer system including a mouse device and a host. The mouse device receives a command script from the host to determine output data to be transmitted to the host. The output data includes, for example, at least one pressed key signal and/or a movement signal. The command script is previously recorded in the host or is determined according to raw data detected by the mouse device. The present disclosure further provides a gaming mouse.

17 Claims, 1 Drawing Sheet

(56) References Cited

U.S. PATENT DOCUMENTS

| | | | | |
|---|---|---|---|---|
| 2019/0294260 | A1* | 9/2019 | Banks | G06F 3/03 |
| 2020/0298110 | A1* | 9/2020 | Koziel | A63F 13/42 |
| 2021/0200326 | A1* | 7/2021 | Huang | A63F 13/22 |
| 2021/0228979 | A1* | 7/2021 | Soelberg | A63F 13/22 |
| 2022/0203230 | A1* | 6/2022 | Kim | A63F 13/211 |

* cited by examiner

COMPUTER SYSTEM AND PERIPHERAL INPUT DEVICE FOR CHANGING MOVEMENT SIGNAL

CROSS REFERENCE TO RELATED APPLICATION

The present application is a continuation application of U.S. patent application Ser. No. 18/368,580 filed on Sep. 15, 2023, which is a continuation application of U.S. patent application Ser. No. 17/536,900 filed on Nov. 29, 2021, the disclosures of which are hereby incorporated by reference herein in their entirety.

To the extent any amendments, characterizations, or other assertions previously made (in this or in any related patent applications or patents, including any parent, sibling, or child) with respect to any art, prior or otherwise, could be construed as a disclaimer of any subject matter supported by the present disclosure of this application, Applicant hereby rescinds and retracts such disclaimer. Applicant also respectfully submits that any prior art previously considered in any related patent applications or patents, including any parent, sibling, or child, may need to be re-visited.

BACKGROUND

1. Field of the Disclosure

This disclosure generally relates to a computer system and, more particularly, to a computer system that determines output data of a gaming mouse according to a command script of a host, and a gaming mouse of the computer system.

2. Description of the Related Art

The conventional mouse device simply outputs detected displacement and keying signals to a host to perform corresponding controls on a running program. However, because a mouse device applied to gaming needs to handle various and complicated controls corresponding to the gaming scenario, the conventional mouse devices cannot fulfill the requirement of game players.

Although the gaming mouse has been provided on the market to provide more operating functions, the commercial available gaming mice provide at most multiple keys and merely output control signals corresponding to the pressed status of the multiple keys.

Accordingly, the present disclosure further provides a computer system that provides more applications of a gaming mouse by incorporating an assistance program in a host, and also provides a high performance gaming mouse.

SUMMARY

The present disclosure provides a computer system and a gaming mouse thereof. The gaming mouse automatically outputs a signal combination of multiple keys and/or a movement signal to a host according to a command script from the host to control an application program running by the host currently.

The present disclosure further provides a computer system and a gaming mouse thereof. A host of the computer system generates a command script or processed data to the gaming mouse according to raw data or images from the gaming mouse to change or adjust a signal combination of multiple keys and/or a movement signal outputted to the host.

The present disclosure provides a computer system including a host and an input device. The host has a processor configured to run an application program and an assistance program. The input device is coupled to the host, and configured to change, according to a current command script transmitted from the assistance program, a movement signal detected by the input device and sent to the application program to perform a corresponding control.

The present disclosure further provides a computer system including a host and a gaming mouse. The host has a processor configured to execute an assistance program. The gaming mouse is coupled to the host, and configured to generate a movement signal detected thereby, and change the movement signal outputted to the host according to a command script transmitted from the assistance program.

The present disclosure further provides a peripheral input device including a gaming mouse. The gaming mouse includes a first-in-first-out (FIFO) buffer and a processor. The FIFO buffer is configured to store multiple command scripts from a host. The processor is configured to adjust a movement signal to control whether to output a movement detected by the gaming mouse, to angle-snap the movement or to smooth the movement sequentially corresponding to the stored multiple command scripts.

In the present disclosure, the assistance program (or algorithm) in a host performs the lift-up cutoff calibration (LCC), the angle snapping, the motion synchronizing, the mouse pad recognition according to raw data or images acquired by a mouse device so as to change or adjust a signal combination of multiple keys and/or a movement signal outputted by the mouse device.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

The present disclosure is applicable to a gaming mouse. The gaming mouse automatically outputs a signal combination of multiple keys and/or a movement signal according to a command script transmitted by an assistance program of a host, or calibrates or changes the signal combination of multiple keys and/or the movement signal actually detected by the gaming mouse.

More specifically, the gaming mouse of the present disclosure includes a first-in-first-out (FIFO) buffer 131 which stores multiple command scripts sent from a host. The processor (or called local processor) 133 of the gaming mouse outputs in a time sequence at least one of a corresponding key signal and a corresponding movement signal according to the multiple command scripts. For example, the local processor 133 automatically (e.g., the gaming mouse not being operated by a user, including no key being pressed and no displacement with respect to a working surface) outputs at least one of a key signal and a movement signal corresponding to a current command script currently outputted from the FIFO buffer 131, or the local processor 133 changes the movement signal actually detected by the gaming mouse according to the current command script, e.g., including whether to output movement, angle snapping the movement, smoothing the movement or the like.

Figure 1:
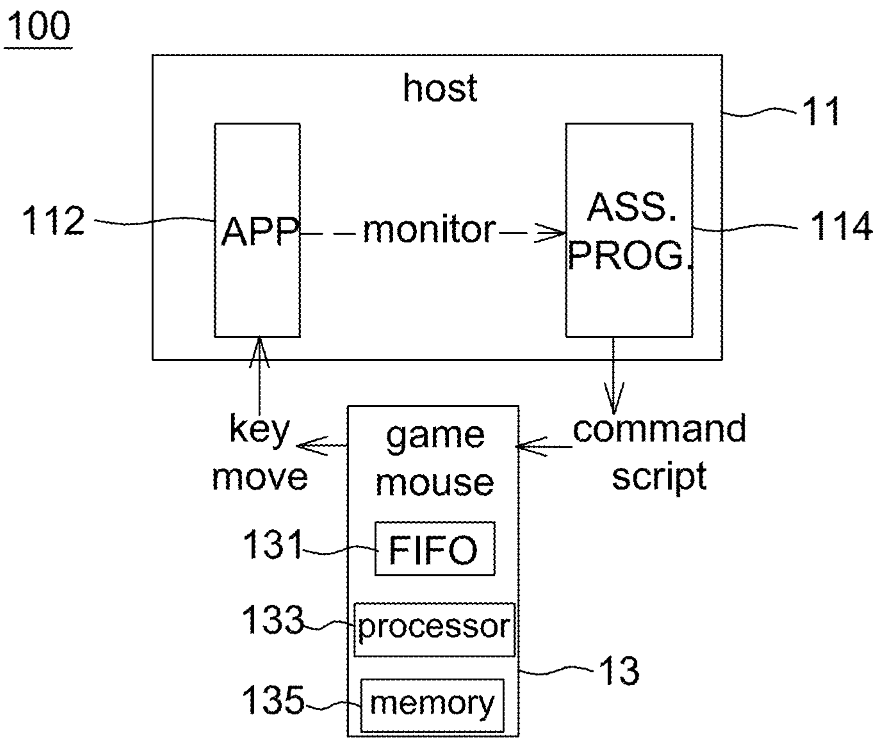
FIG. 1 is an operational schematic diagram of a computer system according to a first embodiment of the present disclosure.

Please refer to FIG. 1, it is an operational schematic diagram of a computer system 100 according to a first embodiment of the present disclosure. The computer system 100 includes a host 11 and an input device 13. The input device 13 is illustrated herein by a gaming mouse as an example, but the present disclosure is not limited thereto.

The host 11 is a computing device, such as a desktop computer, a notebook computer, a tablet computer without particular limitations. The host 11 has a processor for running and executing an application program (shown as APP) 112 and an assistance program (shown as ASS. PROG.) 114 at the same time. The processor is, for example, a central processing unit (CPU) or a micro controlling unit (MCU) of the host 11, and the processor spreads the application program 112 and the assistance program 114 in a memory, e.g., random access memory (RAM), but not limited thereto. For example, the user activates and runs the application program 112 and the assistance program 114 by double clicking on an icon or a file name.

The method of running the application program (or called application algorithm) 112 and the assistance program (or called assistance algorithm) 114 by a processor is known to the art and not a main objective of the present disclosure, and thus details thereof are not described herein.

In the present disclosure, the application program 112 is, for example, a game (including web game), graphic software or any other software that operates according to output of a mouse device. The assistance program 114 is a program or algorithm mainly used to control output of the mouse device, and is stored and embedded in the memory of the host 11 to be executed by the user.

The gaming mouse 13 is coupled to the host 11, and is used to generate at least one of a key signal and a movement signal to the application program 112 for corresponding control according to a command script transmitted from the assistance program 114, e.g., controlling processing of the application program.

The key signal includes a spatial combination of multiple key signals (e.g., multiple keys being pressed at the same time) or a temporal combination of multiple key signals (e.g., multiple keys being pressed at a time sequence, including a single or multiple keys being pressed at each time). In one aspect, the multiple key signals include pressing signals corresponding to a left key and a right of a mouse device (including the gaming mouse of the present disclosure and another mouse device), pressing signals of at least a part of keys of a keyboard device, and a pressing signal of at least one key of another vender device or another consumer device.

For example, the command script controls the gaming mouse 13 to output pressing signals of multiple keys corresponding to a keyboard device (e.g., Ctrl+S, Ctrl+Alt+S, but not limited to) being pressed at the same time and/or pressing signals of a left key and a right key corresponding to a mouse device being pressed at the same time. In another aspect, the command script controls the gaming mouse 13 to output pressing signals of multiple keys corresponding to a keyboard device being pressed at a time sequence (e.g., S→T→R . . . , but not limited to) and/or pressing signals of a left key and a right key corresponding to a mouse device being pressed at a time sequence. It is appreciated that the pressed keys mentioned herein are only intended to illustrate but not to limit the present disclosure.

For example, the host 11 includes a memory (including volatile memory and/or non-volatile memory) for previously recording multiple command scripts. After being set by the user, the host 11 automatically outputs at least one command script to the gaming mouse 13 according to the setting.

In one aspect, the assistance program 114 is used to monitor processing of the application program 112 to accordingly select a current command script from the multiple command scripts in the memory according to an event of the application program 112.

In the case that the application program 112 is a game, the event is, for example, a character being injured. When monitoring that a character is injured (e.g., by comparing gaming frames at different time points, but not limited to), the assistance program 114 outputs a command script to cause the gaming mouse 13 to output at least one key pressing signal, e.g., including a signal to cause the character to defend, to supplement blood, to attack continuously, to setback, to leave a current scene or the like.

In the case that the application program 112 is graphic software, the event is, for example, drawing a straight line. When monitoring that a straight line is being drawn, the assistance program 114 outputs a command script to cause the gaming mouse 13 to output movement signal snapped at a predetermined angle.

In one aspect, when the gaming mouse 13 is generating at least one of a key signal and a movement signal, the gaming mouse 13 is not being operated (e.g., no physical key being pressed or no movement with respect to a working surface). That is, the assistance program 114 controls the gaming mouse 13 to actively and directly output at least one of a corresponding key signal and a corresponding movement signal according to a monitored event.

For example, the assistance program 114 executes and runs a graphical user interface to allow a user to set and select command scripts corresponding to different events, including a single operation (e.g., one key being pressed) or multiple operations (e.g., multiple keys being pressed simultaneously or sequentially).

Preferably, the gaming mouse 13 includes a memory 135 (including volatile memory and/or non-volatile memory) to record a corresponding relationship between multiple command scripts with respect to multiple key signals and multiple movement signals. The local processor 135 of the gaming mouse 13 selects at least one of a key signal and a movement signal corresponding to a current command script, e.g., currently outputted from FIFO buffer 131. The local processor 135 is, for example, an application specific integrated circuit (ASIC), a digital signal processor (DSP), a micro controlling unit (MCU) or field programmable gate array (FPGA) of the gaming mouse 13.

In one aspect, the assistance program 114 is arranged to automatically transmit command script(s) to the gaming mouse 13 to control the gaming mouse 13 to perform repeated operations (sending signals to the application program 112), or the assistance program 114 transmits a corresponding command script to the gaming mouse 13 according to the monitoring result of the application program 112 to control the gaming mouse 13 to perform a corresponding operation (sending signals to the application program 112). The assistance program 114 does not directly control the processing of the application program 112 via a signal line or a bus line in the host 11.

Figure 2:
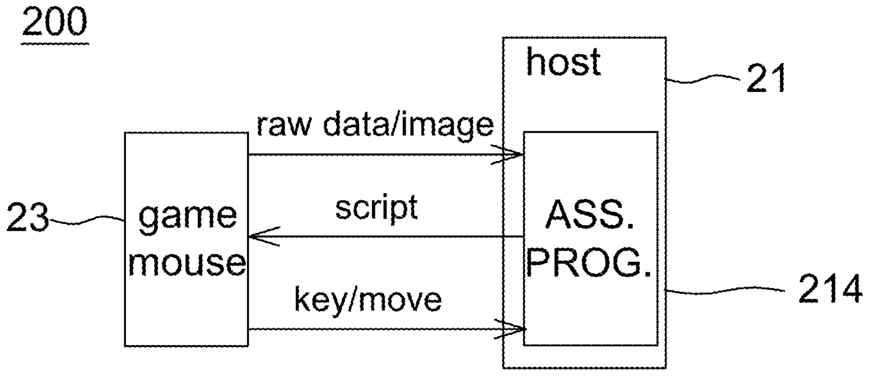
FIG. 2 is an operational schematic diagram of a computer system according to a second embodiment of the present disclosure.

Please refer to FIG. 2, it is an operational schematic diagram of a computer system 200 according to a second embodiment of the present disclosure. The computer system 200 includes a host 21 and an input device 23, which is also illustrated by a gaming mouse as an example, but the present disclosure is not limited thereto.

The host 21 is a computing device, such as a desktop computer, a notebook computer, a tablet computer without particular limitations. The host 21 has a processor for running and executing an assistance program 214. The processor is, for example, a CPU or an MCU of the host 21, and the processor spreads the assistance program 214 in a memory, e.g., RAM, but not limited thereto. For example, the user activates and runs the assistance program 114 by double clicking on an icon or a file name.

The gaming mouse 13 is coupled to the host 21, and is used to output at least one of a key signal and a movement signal, and to adjust or change the key signal and the movement signal outputted to the host 21 according a command script transmitted from the assistance program 214.

In one aspect, the assistance program 214 executes and runs a graphical user interface to allow a user to set and/or select command scripts.

In one aspect, the gaming mouse 23 further outputs raw data or images (e.g., acquired by an optical sensor thereof) to the host 21, and the assistance program 214 generates the command script according to the raw data or images.

In one aspect, the assistance program 214 calculates a lift-up height of the gaming mouse 23 according to the raw data or the images, and the command script is used to control the gaming mouse 23 to whether to output the key signal and the movement signal according to the calculated lift-up height. In one aspect, when calculating, according to the raw data or images, that the lift-up height of the gaming mouse 23 exceeds 5 cm (but not limited to), the assistance program 214 uses the command script to control the gaming mouse 23 to stop outputting the movement or to change a key control function. In another aspect, when calculating, according to the raw data or images, that the lift-up height of the gaming mouse 23 exceeds 5 cm, the assistance program 214 sends height information to the gaming mouse 23, and the gaming mouse 23 identifies (e.g., comparing with a threshold) whether to output movement or to change the key control function. The method of calculating the lift-up height using raw data or images is known to the art and not a main object of the present disclosure, and thus details thereof are not described herein.

In one aspect, the assistance program 214 performs the angle snapping according to the raw data or images, and the command script is used to control the gaming mouse 23 to output movement fitting a snapped angle. For example, when calculating that the gaming mouse 23 is moving toward a specific direction according to the raw data or images, the assistance program 214 uses the command script to control the gaming mouse 23 to output a straight line movement along the specific direction. In this way, the gaming mouse 23 outputs a straight line signal with an angle snapped (e.g., preset by the user) according to the command script.

In one aspect, the assistance program 214 performs the locus smoothing according to the raw data or images, and the command script is used to control the gaming mouse 23 to output smoothed movement signal. For example, the assistance program 214 sends back an average of passed (N−1) movement, e.g., embedded in the command script, to the gaming mouse 23, and the gaming mouse 23 averages a current movement with the averaged (N−1) movement as a way of calculating a smoothed locus, which is then sent to the host 21. The host 21 then controls the moving of a cursor, an object or a character according to the smoothed locus.

In one aspect, the assistance program 214 recognizes a type of a mouse pad according to the raw data or images, and the command script is used to control the gaming mouse 23 to output a movement signal according to the mouse pad type. For example, the assistance program 214 controls the gaming mouse 23 to use different DPIs corresponding to different mouse pad types, but not limited to.

More specifically in the second embodiment, when the assistance program 214 is running, the gaming mouse 23 not only directly outputs the actually detected key signal and movement signal, but also adjusts or controls the output of the key signal and the movement signal according to the command script (including processed data herein, such as averaged movement mentioned above). Which of the original data or adjusted data being required by the host 21 is determined by the running application program (e.g., game or graphic software).

As mentioned in the first embodiment, the key signal includes a spatial combination or a temporal combination of multiple key signals, and the multiple key signals include at least pressing signals corresponding to a left key or a right key of a mouse device (e.g., the gaming mouse 23 and/or another mouse device), and pressing signals corresponding to at least a part of keys of a keyboard device.

It should be mentioned that although a gaming mouse is taken as an example of an input device 13 and 23 of the host in the above embodiments, the present disclosure is not limited thereto. In other aspects, the input device is selected from a keyboard, a joystick, a vender device or a consumer device.

It is appreciated that in the present disclosure, the input device is embedded/installed (before or after shipment) with software corresponding to the host such that the input device is able to output signal(s) according to the command script from the host. The method of calculating the movement/displacement of a mouse device is known to the art (e.g., calculating the correlation between different images), and thus details thereof are not described herein.

In the present disclosure, the gaming mouse and the host are coupled to each other using a known communication interface, e.g., SPI, I2C, BT or the like.

As mentioned above, the conventional mouse device outputs the detection result of a detecting device (e.g., including keys and optical sensor) thereof in one way such that the requirement of various gaming scenario cannot be fulfilled. Accordingly, the present disclosure further provides a computer system and a gaming mouse thereof (e.g., FIGS. 1-2). The gaming mouse is able to automatically output, even without detecting user operation by the detecting device thereof, a key signal combination and/or movement according to a command script from a host; or, to change a detection result of the detecting device, including changing a magnitude, a direction and/or an average of the movement or a key function. Meanwhile, because the output of a gaming mouse is not limited by an operation system of the host, the gaming mouse is able to output operation commands to the current application program with millisecond scale to effectively improve the response time.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A computer system, comprising:
a host, comprising a processor configured to run an application program and an assistance program; and
an input device, coupled to the host, and configured to change, according to a current command script transmitted from the assistance program, a movement signal detected by the input device and sent to the application program to perform a corresponding control.

2. The computer system as claimed in claim 1, wherein the host further comprises a memory configured to previously record multiple command scripts.

3. The computer system as claimed in claim 2, wherein the assistance program is configured to monitor the application program to accordingly select the current command script according to an event of the application program.

4. The computer system as claimed in claim 1, wherein the input device comprises:
a memory, recording a corresponding relationship between multiple command scripts and multiple change types; and
a local processor, configured to change the movement signal according to the current command script.

5. The computer system as claimed in claim 1, wherein the movement signal is changed to
fit a movement outputted by the input device to a snapped angle,
control the input device to output a smoothed locus, or
use different DPIs corresponding to different mouse pad types.

6. The computer system as claimed in claim 1, wherein the host is configured to determine the current command script according to raw data or images outputted from the input device.

7. The computer system as claimed in claim 1, wherein the application program is a game or graphic software.

8. The computer system as claimed in claim 1, wherein the assistance program is further configured to run a user graphic interference for providing a user to set and select the command script.

9. A computer system, comprising:
a host, comprising a processor configured to execute an assistance program; and
a gaming mouse, coupled to the host, and configured to generate a movement signal detected thereby, and change the movement signal outputted to the host according to a command script transmitted from the assistance program.

10. The computer system as claimed in claim 9, wherein the gaming mouse is further configured to output raw data to the host, and
the assistance program is configured to generate the command script according to the raw data.

11. The computer system as claimed in claim 10, wherein the assistance program is configured to calculate a lift-up height of the gaming mouse according to the raw data, and
the command script is configured to control the gaming mouse to whether to output a movement according to the calculated lift-up height.

12. The computer system as claimed in claim 10, wherein the assistance program is configured to perform an angle snapping according to the raw data, and
the changed movement signal is fitting a movement outputted by the gaming mouse to a snapped angle.

13. The computer system as claimed in claim 10, wherein the assistance program is configured to execute a locus smoothing according to the raw data, and
the changed movement signal is controlling the gaming mouse to output a smoothed locus.

14. The computer system as claimed in claim 10, wherein the assistance program is configured to recognize a mouse pad type according to the raw data, and
the changed movement signal is using different DPIs corresponding to different mouse pad types.

15. The computer system as claimed in claim 9, wherein the assistance program is further configured to run a graphic user interference for providing a user to set and select the command script.

16. A peripheral input device, comprising:
a gaming mouse, the gaming mouse comprising:
a first-in-first-out buffer, configured to store multiple command scripts from a host; and
a processor, configured to adjust a movement signal to control whether to output a movement detected by the gaming mouse, to angle-snap the movement or to smooth the movement sequentially corresponding to the stored multiple command scripts.

17. The peripheral input device as claimed in claim 16, wherein the processor is configured to automatically adjust the movement signal corresponding to a current command script.

* * * * *